July 23, 1946.　　　G. A. LYON　　　2,404,390
WHEEL STRUCTURE
Filed June 21, 1943　　2 Sheets-Sheet 2
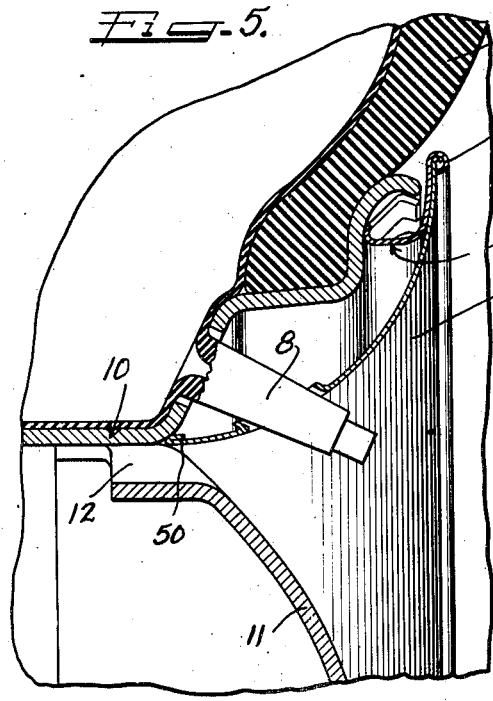
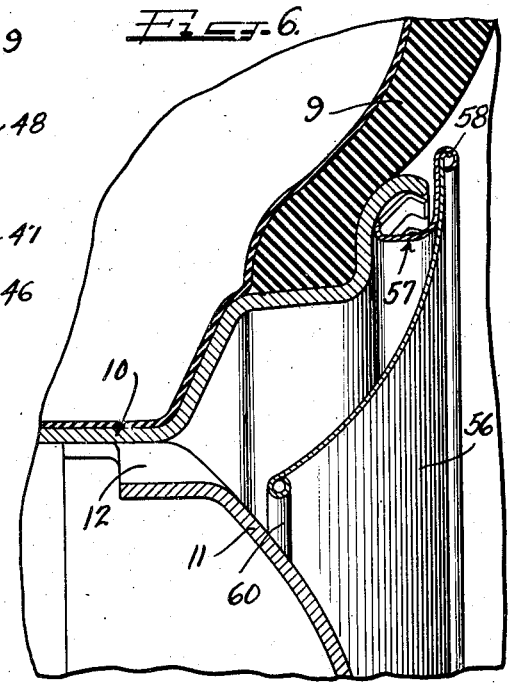
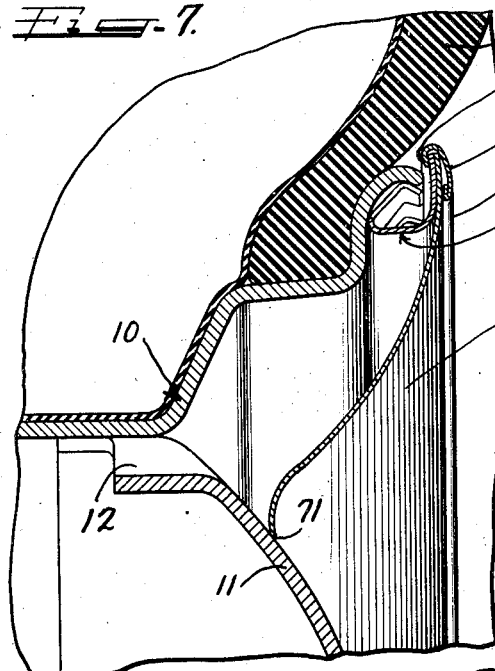
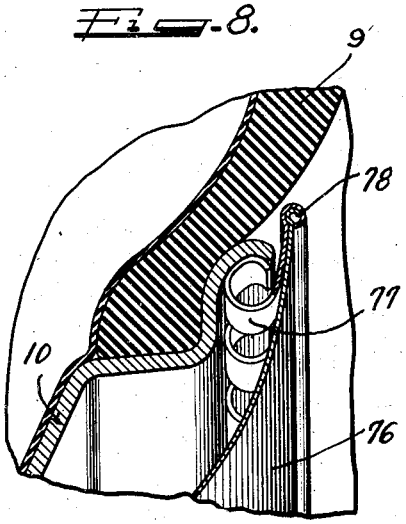
Inventor
GEORGE ALBERT LYON.
by Charles W. Hills Attys.

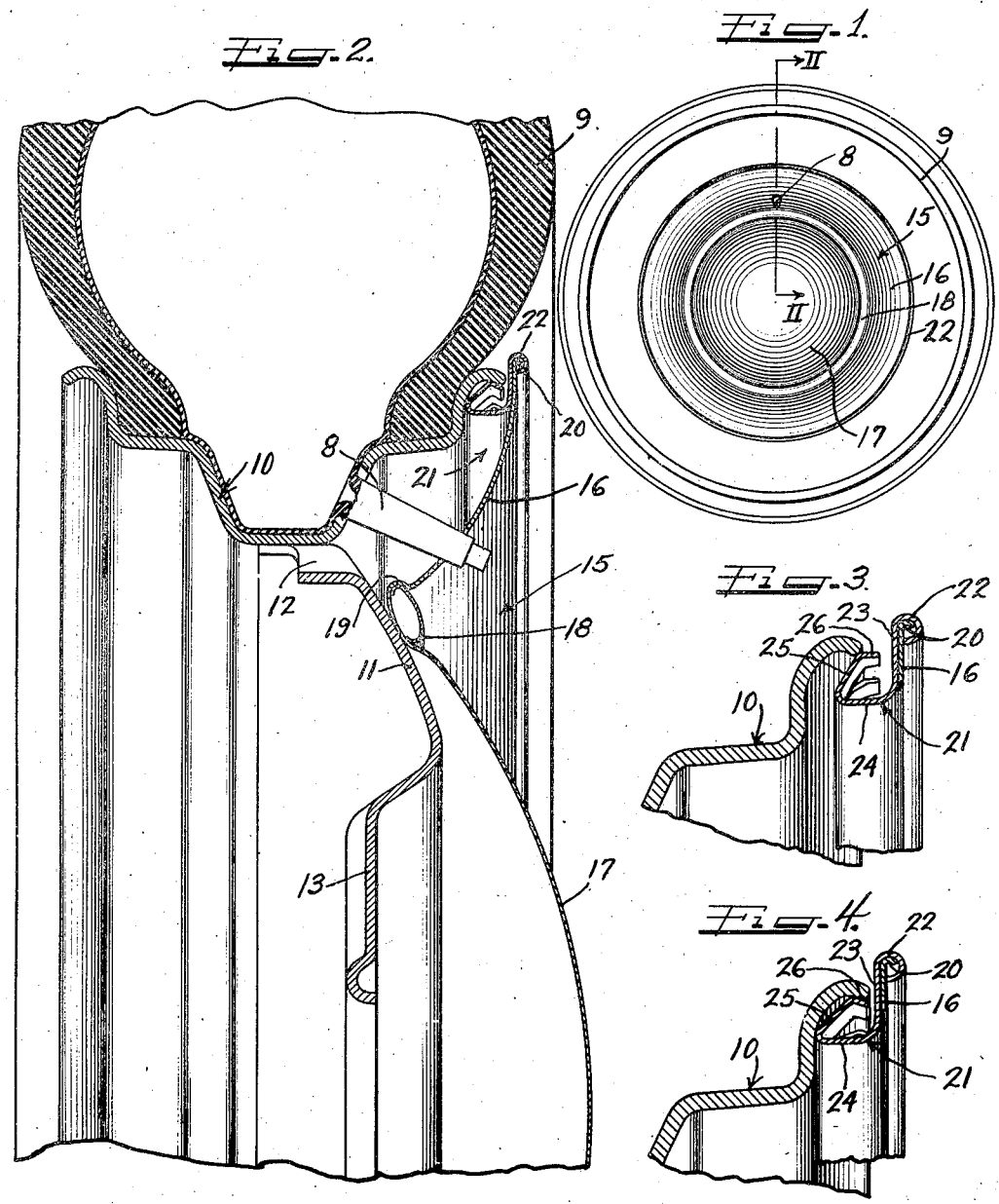

Patented July 23, 1946

2,404,390

UNITED STATES PATENT OFFICE 2,404,390

WHEEL STRUCTURE

George Albert Lyon, Allenhurst, N. J.

Application June 21, 1943, Serial No. 491,604

12 Claims. (Cl. 301—37)

1

This invention relates to a wheel structure and more particularly to an ornamental trim or wheel cover therefor.

An object of this invention is to provide a simplified form of ornamental trim for a wheel wherein the means utilized for retaining the trim on the wheel may also be employed for the purpose of strengthening and ornamenting the wheel trim.

Another object of this invention relates to the provision of a cover which may be made of resilient material such as plastic and wherein provision is made for the reinforcing of the cover or wheel trim at its point of retention on the wheel.

Another object of this invention resides in the provision of a novel structure wherein a wheel trim or wheel cover cooperates in a unique manner with the flanges of the tire rim so as to properly position the wheel trim and yet rigidify it at its point of securement to the wheel.

In accordance with the general features of this invention there is provided in a wheel structure, including a multi-flanged rim for carrying a tire and having exposed flanged surfaces adjacent the tire which are to be concealed, a circular wheel trim having an outer edge terminating radially beyond the rim and adjacent the outer side wall of the tire carried and annular means for retainingly holding the outer edge of the trim and provided with rearwardly extending resilient means for engaging an outer edge of the rim when the cover member is pressed axially against the rim so as to be self-retained on the wheel with the cover member extending radially inwardly therefrom over the flanged surfaces of the rim concealed thereby.

Another feature of the invention relates to the provision in the aforesaid structure of retaining means in the form of fingers, each including a free axially extending extremity deflectible radially into an inclined retaining position when the trim is pressed axially against the flange of the tire rim.

A further feature of the invention relates to the provision of a wheel trim of the aforesaid characteristics which may be embodied either in an annular ring or in a complete wheel disk and irrespective of said two applications has the same advantageous feature.

A further feature of the invention relates to the application of my novel trim structure to a wheel disk and to the provision in the wheel disk when it is made of a plastic material of intermediate rigidifying means in the form of a bead

2 of metal or the like snapped into retained position in an intermediate annular channel in the cover.

Other objects and features of this invention will more fully appear from the following detail description taken in connection with the accompanying drawings which illustrate several embodiments thereof and in which:

Figure 1 is a side elevation of a wheel structure embodying the features of this invention;

Figure 2 is an enlarged fragmentary cross-sectional view taken on the line 2—2 of Figure 1, looking in a direction indicated by the arrows and showing my invention as applied to a wheel disk;

Figure 3 is a fragmentary cross-sectional view corresponding to an upper right-hand portion of Figure 2 and illustrating my novel cover in the process of being pressed axially home into retaining cooperation with the outer flange of the tire rim;

Figure 4 is a sectional view somewhat similar to Figure 3 but illustrating the position of the cover after it has been pressed home and into retaining engagement and in which engagement the fingers have been radially deflected into their retaining position;

Figure 5 is a fragmentary cross-sectional view similar to Figure 2 showing a modified form of my invention in which the novel aspects thereof are applied to an annular trim ring;

Figure 6 is a sectional view similar to Figure 5 illustrating a further modification of the invention wherein the inner edge of the trim ring is held away from the cooperating parts of the wheel;

Figure 7 is a sectional view similar to Figures 5 and 6 but showing a slightly modified way of attaching the retaining ring to the ornamental trim as well as showing the trim in contact at its inner edge with the wheel body; and Figure 8 is a further sectional view similar to Figure 5 but illustrating a slightly modified form of retaining finger.

As shown on the drawings:

The reference character 9 designates generally a conventional type of tire having the usual inner tube therein and provided with the customary valve stem 8 extending through a lateral flange of a conventional drop center multi-flanged tire rim 10. Connected in the usual way at spaced intervals to the base of the tire rim is a wheel body 11 which has openings 12 alternating with the areas of attachment of the wheel body to the base flange of the rim. These openings, as is well-known in the art, are provided to enable the circulation of air in and about the brake drum associated with the conventional automobile wheel.

The wheel body 11 is of a metallic construction and embraces the usual central dished section formed into a bolt-on flange 13 by means of which the wheel may be attached, as is well-known in the art, in a detachable manner to a support on an axle or the like.

Associated with the aforesaid conventional wheel is a wheel cover designated generally by the reference character 15 embracing the features of this invention. As noted hereinbefore in the first form of the invention described herein, the features of the invention have been illustrated as being applied to a wheel trim in the form of a complete disk, although it is to be understood, as is evident from the modifications to be hereinafter described, that the invention is equally well applicable to a wheel trim in the form of an annulus.

The wheel cover 15 embodies two main transversely curved sections 16 and 17 which are integrally connected and are fabricated from a highly resilient material such, for example, as synthetic plastic sheet which is resistant to permanent deformation and yet is resilient enough to return of its own accord to its original contour upon indenture of the same by reason of blows or the like. I have obtained excellent results in the fabrication of wheel trim members from a plastic known commercially to the trade as ethyl cellulose which is a well-known form of a thermoplastic material.

The section 16 may be termed the wheel trim ring part of the cover whereas the section 17 may be termed the hub cap part of the cover. Each of these parts is of a convex, concave curved cross-sectional shape and in reality embody oppositely facing curved surfaces. The two sections 16 and 17 at their junction are rigidified by a metallic hollow annular bead which has turned edges, the outermost one of which is resiliently snapped behind an annular shoulder 19 formed in the trim ring section 16. This arrangement is such as to rigidify the two sections 16 at their junction as well as at their point of bearing on the wheel body 11 as shown in Figure 2. Also the annular metallic ring 18, particularly if it is made of stainless steel or is given a lustrous finish adds materially to the ornamental effect of the cover in that it is contrasted against the differently finished surfaces of the two sections 16 and 17.

Now my invention is particularly concerned with the means for attaching this cover to the wheel in a detachable manner as well as for rigidifying the outer peripheral edge of the cover 15. I provide for these objectives by the use of an annular metallic ring 21 which may be manufactured economically on a large production basis by the rolling of the same from suitable strip stock and by the subsequent splitting of the stock to provide fingers. This retaining ring 21, as is best shown in Figures 3 and 4, has an outer turned edge 22 which extends over and around the outer edge 20 of the ring 16 so as to securely lock the cover to the attaching ring 21. In the application of the cover to this ring the outer edge of the cover is initially flexed under the turned edge 22 of the ring 21 and then the turned edge 22 is more tightly curled against the edge of the cover so as to interlock the two parts together. I have found that it is easy to flex the outer edge of the cover into the channel afforded by the turned outer edge of the ring 21 and that thereafter the two may be easily interlocked by tightly rolling the outer edge 22 of the ring 21 against and relative to the edge 20. Thus the turned edge 22 not only attaches the ring 21 to the cover but, in addition thereto, rigidifies the outer edge of the cover or wheel trim. Furthermore, by reason of the fact that the turned edge 22 extends around to the front or outer side of the cover it adds to the ornamental appearance of the cover and this is particularly true when this turned edge 22 is given a lustrous finish such as that which is obtainable by chromium platings and also by the use of stainless steel.

The trim ring, in addition to the turned edge 22, includes a radially inwardly extending flange 23 bent rearwardly into an axially extending flange 24 which has formed on it axially outwardly extending spaced cover retaining fingers 25. These fingers may be of any suitable number and each includes an axially extending, free extremity 26 which projects toward the rear side of the wheel cover or trim.

In applying the cover to the wheel, the cover is first pressed against the wheel into the position shown in Figure 3 in which the extremities 26 of the fingers are about to enter the outermost curled flange of the wheel rim 10, that is to say the extremities 26 bear against the outermost edge of the wheel rim 10 and must be cammed or deflected in order for them to enter the channel of the flange behind this edge of the rim.

In Figure 4 I have illustrated the position of the fingers after they have been cammed or deflected radially inwardly by reason of the pressing of the cover axially home into its retained position on the wheel. It will be noted from this figure that the extremities 26 of the fingers are no longer axially straight but are in reality bent or deflected into an inclined position so that the fingers are under tension in their gripping engagement with the rim flange in which they have been pressed. By avoiding a biting engagement of the tip of the finger with the flange of the rim, I find that I am able to provide a structure which is more easily removable from the tire and yet is one wherein there is sufficient resiliency in the fingers to tightly hold the cover on the wheel in the use of the wheel.

The metal ring 21, as noted before, not only serves as a means of attachment but in addition provides a point or place for the application of a pry-off force when it is desired to eject the cover from the wheel. This prying off of the cover may be effected by the insertion of the end of a pry-off tool underneath the turned edge 22 or, in other words, between the turned edge and the tire. Thereafter the application of a slight leverage force on the pry-off tool which might be a screw driver will enable the cover to be readily sprung or ejected from the wheel.

In order to simplify the description of the modifications to now be described I have used the same reference numerals as in the previously described embodiment insofar as the parts of the wheel are concerned. The reason for this is that the wheel is conventional and embraces substantially the same parts in all modifications.

In Figure 5 the wheel cover or trim is illustrated as being in the form of a trim ring 46 and has attached to its outer peripheral edge a metal retaining ring 47 locked to the trim ring 46 by the turned edge 48. This ring 47 when it is interlocked with the trim ring 46 is the same as in the first form of the invention and hence no further description of the same is needed.

It should be noted that in this form of the invention as in the first described form, the trim ring is of a shape and depth so as to conceal the exposed surfaces of the side flanges of the wheel rim 10. In addition, the trim ring 46, as in the preferred form, may be apertured to permit the valve stem to extend therethrough so as to render the valve stem accessible.

The inner edge 50 of the trim ring 46 is turned and is formed to bear against the junction of the two wheel parts 10 and 11. This arrangement is such that the trim ring does not, in any way, interfere with the circulation of air through the wheel openings 12 of the wheel body 11.

The application and removal of this plastic ring 46 is the same as in the first described form of the invention.

In Figure 6 I have illustrated a slightly different form of trim ring 56 which is made of plastic and is interlocked at 58 with a metal retaining ring 57 corresponding to the ring 21 in the first described form of the invention.

The inner edge 60 of the trim ring 56 is turned or rolled upon itself and is so constructed as to be radially inwardly of the wheel openings 12 but is spaced from the wheel body 11 so as to allow air to circulate under this edge 60.

In Figure 7 the plastic trim ring 66 is interlocked by a slightly different arrangement to the retaining ring 67. With the exception of the type of interlock the retaining ring 67 functions in identically the same way as the retaining ring 21 previously described. The interlocking or fastening of the ring 67 to the trim ring 66 is effected by means of a separate hollow bead 68 which has its outer edge turned around an outer edge of the ring 67 and the edge of the ring 66 to lock the two together. The inner edge 70 of this additional bead or ring 68 is likewise turned upon itself so as to avoid the presentation of any sharp edge. The ring or bead 68 may be given a highly lustrous finish such as is possible in the use of stainless steel so that a highly ornamental effect may be provided.

In this form of the invention the trim ring 66 is at its inner edge curled slightly outwardly as designated 71 and is formed to bear axially on the wheel body 11.

The form of the invention illustrated in Figure 8 is substantially the same as that of the first form with the exception of the configuration of the fingers of the retaining ring 77. In this form of the invention the plastic trim ring 76 is interlocked with the retaining ring and fingers 77 at the turned edge 78. The retaining fingers of the ring 77 instead of having a straight extremity are curled upon themselves so as to conform generally to the curvature of the channel in the rim in which the fingers are to engage. The operation of this form of the invention however is substantially the same as that of the previously described embodiments and hence no further description of the same is necessary.

It will be perceived that in all forms the outer turned edge of the cover or wheel trim is slightly spaced from the tire beyond the outer edge of the tire rim so that in the event the tire becomes punctured there is still a slight clearance present to allow for the collapsing of the tire. Even if the tire should, upon collapsing, contact the outer turned edge of the trim ring or wheel cover it would still not result in any damage to the cover since the cover is of a resilient character and is resiliently carried on the tire rim of the wheel. Also by reason of the fact that the outer edge of the wheel cover or trim comprises a turned edge of metal, such edge should it bear against the tire in the operation of the tire, will better resist wear and tear than would be the case if it was a raw plastic edge.

I claim as my invention:

1. In a wheel structure including a multi-flanged rim for carrying a tire and having exposed flange surfaces adjacent the tire which are to be concealed, a wheel cover member of convex-concave cross-sectional shape and of a radial depth sufficient to conceal said flange surfaces, said cover member being made of a synthetic plastic material having the physical property of being self-sustaining and yet resiliently deflectable without permanent deformation, the outer edge of said member terminating radially beyond the rim and adjacent the outer side wall of the tire, and comparatively more rigid means made from material such as metallic sheet and the like for holding said member on the wheel, said means comprising a ring having a channeled outer edge in which the outer edge of the cover member is adapted to be disposed and retained, and having rearwardly deflectable resilient means for engaging an outer edge of the rim to the rear of the cover member for detachably holding the cover member thereon.

2. In a wheel structure including a multi-flanged rim for carrying a tire and having exposed flange surfaces adjacent the tire which are to be concealed, a wheel cover member of convex-concave cross-sectional shape and of a radial depth sufficient to conceal said flange surfaces, said cover member being made of a synthetic plastic material having the physical property of being self-sustaining and yet resiliently deflectable without permanent deformation, the outer edge of said member terminating radially beyond the rim but adjacent the outer side wall of the tire, and comparatively more rigid means made from material such as metallic sheet and the like for holding said member on the wheel, said means comprising a ring having a channeled outer edge in which the outer edge of the cover member is adapted to be disposed and retained and having rearwardly deflectable resilient means for engaging an outer edge of the rim to the rear of the cover member for detachably holding the cover member thereon, said rearwardly extending means comprising outwardly extending resilient fingers each of which has an axially extending free portion deflectable radially inwardly as the cover member is pressed axially home into retaining position on the wheel.

3. In a wheel structure including a multi-flanged rim for carrying a tire and having exposed flange surfaces adjacent the tire which are to be concealed, a wheel cover member of convex-concave cross-sectional shape and of a radial depth sufficient to conceal said flange surfaces, said cover member being made of a synthetic plastic material having the physical property of being self-sustaining and yet resiliently deflectable without permanent deformation, the outer edge of said member terminating radially beyond the rim but adjacent the outer side wall of the tire, and comparatively more rigid means made from material such as metallic sheet and the like for holding said member on the wheel, said means comprising a ring having a channeled outer edge in which the outer edge of the cover member is adapted to be disposed and retained, and having rearwardly deflectable resilient means for engaging an outer edge of the rim to the rear of the cover member for detachably holding the cover member thereon, said cover member having an intermediate depressed annular groove with a reentrant portion in which is resiliently snapped a metallic bead for strengthening the cover radially inwardly of the tire rim.

4. In a wheel structure including a multi-flanged rim for carrying a tire and having exposed flange surfaces adjacent the tire which are to be concealed, a wheel cover member of convex-concave cross-sectional shape and of a radial depth sufficient to conceal said flange surfaces, said cover member being made of a synthetic plastic material having the physical property of being self-sustaining and yet resiliently deflectable without permanent deformation, the outer edge of said member terminating radially beyond the rim but adjacent the outer side wall of the tire, and comparatively more rigid means made from material such as metallic sheet and the like for holding said member on the wheel, said means comprising a ring having a channeled outer edge in which the outer edge of the cover member is adapted to be disposed and retained, and having rearwardly deflectable resilient means for engaging an outer edge of the rim to the rear of the cover member for detachably holding the cover member thereon, said retaining means comprising a plurality of curled fingers each of which having a curled extremity conforming generally in shape with the contour of an outermost flange of the rim for nesting therein in resilient cover retaining contact therewith.

5. As an article of manufacture, a circular wheel trim for a wheel including a flanged tire rim including an annular section of curved cross-sectional contour and of a radial depth sufficient to extend substantially from an outer edge of the rim substantially over the exposed surfaces of the tire rim flanges and made of a plastic material having the physical property of being self-sustaining and yet being resiliently deflectable without permanent deformation, and retaining means at the outer periphery of said section formed for resilient detachable retaining engagement with a flange of the tire rim adjacent the outer periphery of the tire rim, said means having a circular ring portion cooperating with the outer edge of the said trim section and with a flange of the rim.

6. As an article of manufacture, a circular wheel trim for disposition over the exposed surfaces of the flanges of a wheel tire rim including an annular section of curved cross-sectional contour and of a radial depth sufficient to extend from the tire over the exposed surfaces of the tire rim flanges and made of a synthetic plastic material having the physical property of being self-sustaining and yet being resiliently deflectable without permanent deformation, and retaining means at the outer periphery of said section formed for resilient detachable retaining engagement with a flange of the tire rim adjacent the outer periphery of the tire rim, said means having a circular ring portion for embracing the outer edge of the said trim section to rigidify said edge radially beyond the place of attachment of the section to the wheel tire rim, said retaining means including spaced radially outwardly turned fingers each having an axial free portion adapted to be cammed over an outer edge of the rim and into resilient gripping engagement with a surface of the rim flange inside said edge.

7. As an article of manufacture, a circular wheel trim for disposition over the exposed surfaces of the flanges of a wheel tire rim including an annular section of curved cross-sectional contour and of a radial depth sufficient to extend from the tire over the exposed surfaces of the tire rim flanges and made of a synthetic plastic material having the physical property of being self-sustaining and yet being resiliently deflectable without permanent deformation, and retaining means at the outer periphery of said section formed for resilient detachable retaining engagement with a flange of the tire rim adjacent the outer periphery of the tire rim, said means having a circular ring portion for embracing the outer edge of the said trim section to rigidify said edge radially beyond the place of attachment of the section to the wheel tire rim, said annular portion of the retaining means being curled axially outwardly and radially inwardly about the outer edge of said annular trim section to hold said edge away from the tire and to rigidify said edge so that a pry-off tool may be applied to the same when it is desired to detach the trim from the wheel.

8. In a wheel structure including a tire rim and a central load bearing portion, there being a circular, generally radially inwardly extending shoulder on said rim, a cover assembly including a circular portion disposed radially over a portion of the wheel structure, said circular portion being formed from synthetic sheet material, and an annular, relatively rigid, reinforcing, retaining member for said cover portion, said retaining member including a circular part exposed from the axially outer side of the cover and extending radially outwardly of the radially outer peripheral edge thereof and also including a circular portion arranged for snap-on engagement with a portion of the wheel, said snap-on portion of the retaining member merging into a circular portion arranged to extend over the radially outer edge of said cover portion.

9. In a wheel structure including a flanged tire rim and a central load bearing portion, there being a generally radially inwardly extending, circular shoulder on said wheel, a cover assembly including a circular cover member formed from sheet synthetic plastic material having the radially outer edge thereof disposed radially outwardly of the radially outer extremity of the wheel structure, and a retaining annulus for maintaining said cover on the wheel structure, including an annular sheet metal member having the axially outer edge thereof curled around the radially outer edge of the cover to envelop the same and having the axially inner part thereof curved radially inwardly and then axially inwardly to provide an axially inwardly extending resilient snap-on flange for retaining engagement with the wheel structure.

10. In a wheel structure including a tire rim and a central load bearing portion, there being a circular, radially inwardly extending shoulder on said wheel, a cover assembly including a circular cover member formed from sheet synthetic plastic material and having the radially outer edge thereof terminating in the vicinity of said shoulder on the wheel, and circular, reinforcing, retaining means for maintaining said cover on the outer side of the wheel structure, said retaining means including an axially outer portion extending radially outwardly over the radially outer edge of said plastic cover portion and also including a part bent back upon said radially extending portion and terminating in a generally axially inwardly extending flange, said flange terminating in a bead arranged to retainingly envelop the radially outer edge of said plastic cover member and also being arranged to retainingly engage with said shoulder on the wheel structure to maintain the cover detachably thereover.

11. As an article of manufacture, a circular cover assembly for disposition over the outer side of a wheel structure, said cover assembly including a portion having at least a radially outer margin formed from synthetic plastic sheet material and arranged to extend radially outwardly on a wheel, and an annular reinforcing member having a radially extending annular part disposed to form a reinforcing, ornamental border for said plastic cover member, a portion formed to envelop the radially outer edge of said plastic cover member and a portion arranged to retainingly engage a portion of a wheel over which it is disposed for maintaining the cover in detachable engagement thereon.

12. In a cover assembly for disposition over the outer side of a wheel structure having a tire rim and a central load bearing portion, a cover portion formed from resiliently pliable material such as sheet synthetic plastic, said cover portion extending radially outwardly substantially over the outer side of the tire rim and an annular relatively rigid member having a part extending radially inwardly behind the cover portion and into detachable, retaining engagement with a part of the wheel and said annular member also having a part for enveloping the edge of the cover portion to reinforce the same and to constitute an ornamental border therefor.

GEORGE ALBERT LYON.